2,927,938

Patented Mar. 8, 1960

2,927,938

PREPARATION OF CHLOROFLUOROSILANES BY THE SELECTIVE FLUORINATION OF CHLOROALKOXYSILANES WITH BORON TRIFLUORIDE

Murray S. Cohen and Joseph Green, Dover, N.J., assignors, by mesne assignments, to Thiokol Chemical Corporation, a corporation of Delaware No Drawing. Application November 2, 1956
Serial No. 619,945

11 Claims. (Cl. 260—448.8)

This invention relates to the preparation of (1) alkyl and aryl dichlorofluorosilanes and chlorodifluorosilanes, $RSiCl_nF_{3-n}$, useful as intermediates in the preparation of hydraulic fluids, and of (2) novel, partially alkoxylated derivatives of alkyl and aryltrichlorosilanes $$RSiCl_n(OR')_{3-n}$$

where $n=1$ or 2, R=alkyl or aryl and R'=lower alkyl less than 4 carbon atoms. The latter are useful as plastics which are utilized in the manufacture of articles in the usual manner accorded plastic materials.

A principal object of our invention is to provide a novel method of preparing the above chlorofluorosilanes in essentially purer form and in significantly higher yields than are achieved by the use of methods known to the art.

Another principal object is to provide a method of preparing novel, partially alkoxylated derivatives of alkyl and aryltrichlorosilanes, which derivatives are adapted for use (a) as intermediates in the preparation of the foregoing fluorinated alkyl and aryltrichlorosilanes; (b) as cross-linking agents; (c) as chain-terminating agents; and (d) as monomeric structural units in the preparation of liquid polysiloxanes, as well as of solid polymers of thermoplastic and of thermosetting types, which are heat stable at relatively high temperatures.

Still another principal object is to provide a method adapted for the continuous production (as distinguished from batch production) of the above two types of derivatives—namely fluorinated and partially alkoxylated alkyl and aryltrichlorosilanes.

Another object is to prepare partially alkoxylated derivatives of alkyl and aryltrichlorosilanes by reacting one of these trichlorosilanes with a lower, aliphatic, monohydric alcohol.

Another object is to cause replacement with a fluoro group of each alkoxy group in the partially alkoxylated derivatives last above mentioned, by causing one or more of said derivatives to react with boron trifluoride.

Other objects and advantages of our invention will appear as the description thereof proceeds.

The group of R-dichlorofluorosilanes ($RSiCl_nF_{3-n}$ where $n=1$ or 2 and R=methyl, ethyl, phenyl, or tolyl), which are valuable intermediates for the preparation of siloxane polymers, have been formed hitherto by the interaction of the corresponding R-trichlorosilanes as starting materials with antimony trifluoride. We have discovered that an R-dichlorofluorosilane and an R-chlorodifluorosilane can be prepared from a suitable R-trichlorosilane, first, by partial alkoxylation of the latter with a lower aliphatic alcohol, and then by replacement of alkoxy in the resulting product through treatment thereof with gaseous boron trifluoride. These two steps of our novel process may be represented, respectively, by the following two equations:

(1) $RSiCl_3 + C_2H_5OH \rightarrow$
$RSiCl_2OC_2H_5 + RSiCl(OC_2H_5)_2 + HCl$ (2) $RSiCl_2OC_2H_5 + RSiCl(OC_2H_5)_2 + BF_3 \rightarrow$
$RSiCl_2F + RSiClF_2 + (C_2H_5O)_2BF$ where R, as indicated above, is $CH_3$, $C_2H_5$, $C_6H_5$, or $CH_3C_6H_4$. As will be seen, the ratio of products can be adjusted by a judicious selection of the ratio of reactants, $RSiCl_3/C_2H_5OH$.

The first of the above steps alone, and the above two steps in sequence are adapted for the continuous production, respectively, of alkoxylated alkyl and aryl chlorosilanes, and of alkyl and aryl chlorofluorosilanes.

The reaction of each of the foregoing alkyl and aryltrichlorosilanes with absolute ethanol, for example, yields a mixture of ethoxylated products. The components of this mixture, however, can be separated by conventional methods of rectification; or the mixture can be fluorinated directly. In the latter event the resulting mixed chlorofluorosilanes can be separated from one another by rectification, which is simplified by the fact that a decrease of the order of 30° C. in the boiling point of the resulting chlorofluorosilane accompanies the substitution of each successive fluoro group for a chloro group.

The partially ethoxylated derivatives, phenyldichloroethoxysilane and phenylchlorodiethoxysilane, have been isolated and characterized. They are valuable not only as intermediates, respectively, in the preparation of phenyldichlorofluorosilane and phenylchlorodifluorosilane by the aforedescribed process, but also as cross-linking agents, as chain-terminating agents, and as monomeric materials for forming liquid, elastomeric, and solid polysiloxanes. The solid polymers, which may be of either a thermoplastic or thermosetting type, are heat stable at relatively high temperatures—for example, at temperatures above 250° C.

Although the partially alkoxylated R-trichlorosilanes are monoalkoxy and dialkoxy derivatives resulting from the practice of our novel method, we preferably carry out our process in such a manner that a major yield of the monoalkoxy derivative is obtained. The reason for this preferred procedure lies in one of our stated principal objects—namely, the preparation, inter alia, of monofluoro dichlorosilanes. As is shown by the data in Table I in Example IV hereinbelow, an essential factor in the production of a high yield of a monoalkoxy dichlorosilane is the employment of a large molar excess of the trichlorosilane starting material over the amount of alcohol used.

Although the foregoing Equation 2 indicates that two-thirds mole of boron trifluoride reacts with one mole of a monoethoxydichlorosilane, in practice an excess of boron trifluoride regularly is used.

The following examples, in which are described various embodiments of our invention, are illustrative only.

All temperatures stated hereinafter are in degrees centigrade.

EXAMPLE I

To a solution of 373 grams (2.5 moles) of methyltrichlorosilane in a mixture of 238 grams (3.0 moles) of pyridine and 1000 ml. of dry toluene there were added slowly, with stirring, 147 ml. (2.5 moles) of absolute ethanol in 500 ml. of toluene. The completed mixture was heated under reflux for 2 hours, and then was filtered from the pyridine hydrochloride. The filtrate was distilled to give a fraction boiling at 104° to 109°, which proved to be a methyldichloroethoxysilane-toluene azeotrope.

Boron trifluoride was passed into the refluxing azeotropic mixture, and volatile materials were caught in a series of cold traps. Trap I was maintained at tap-water temperature (15°), while trap II was held at −10°, and trap III at −80°. The reaction was considered to be completed when the rate of distillation into trap I became negligible. Trap I was found to contain principally methyldichlorofluorosilane, while the contents of trap II consisted for the most part of methylchlorodifluorosilane. All traps then were allowed to stand at room temperature (22°), and volatile fractions were vented to the exhaust. The remaining material was distilled, and a fraction was collected which boiled at 28° and weighed 81 grams. Analytical results were in agreement with the formula for methyldichlorofluorosilane.

EXAMPLE II

Methyldichloroethoxysilane was prepared in pure form by conducting the first-step, alcohol reaction in essentially the manner described in Example I, except that xylene was substituted for the toluene. Distillation of the crude xylene solution gave a 27 percent yield of methyldichloroethoxysilane, boiling at 98.5° to 103°.

A 211-gram sample of this ethoxy compound was treated with a stream of boron trifluoride at reflux temperature (98°). The volatile material which formed was caught in three traps, as aforedescribed. Redistillation of this material yielded 117 grams of methyldichlorofluorosilane (70 percent based upon methyldichloroethoxysilane used) along with a smaller yield of methylchlorodifluorosilane.

EXAMPLE III

A 10-mole sample of methyltrichlorosilane was treated at 5° to 10° with 4.0 moles of absolute alcohol. Hydrogen chloride traces were removed by passing a stream of dry nitrogen through the reaction mixture. A distilling column was fitted to the system, and boron trifluoride was passed in. The reaction mixture was heated to slow reflux (approximately 65°), and the resulting volatile fraction was collected through the distilling column in a solid carbon dioxide-acetone cooled receiver. After about six hours of reaction the liquid distillate was removed, the receiving flask was allowed to come to room temperature (22°), and volatiles—which consisted of a mixture of methyltrifluorosilane and methylchlorodifluorosilane—were collected in a solid carbon dioxide trap. The remaining material was redistilled through a 3-foot Vigreux column, and a fraction, boiling at 28° to 30°, was collected. The yield of this material, methyldichlorofluorosilane, was 207 grams (39 percent of theoretical based upon ethanol used).

EXAMPLE IV

The preparation of phenyldichloroethoxysilane was carried out a number of times. It was found that this compound, as a desired intermediate, could be prepared in suitable quantities by employing a large excess of phenyltrichlorosilane relative to the amount of the alcohol reactant. Table I illustrates the effect of changing the molar ratio of reactants, phenyltrichlorosilane and ethanol, upon the molar ratio of monoethoxy and diethoxy derivatives of phenyltrichlorosilane.

*Table I*

| Reaction No.: | Reactant Ratio, $\frac{C_6H_5SiCl_3}{C_2H_5OH}$ | Product Ratio, $\frac{C_6H_5SiCl_2OC_2H_5}{C_6H_5SiCl(OC_2H_5)_2}$ |
| --- | --- | --- |
| 1 | 0.67 | 1.15 |
| 2 | 0.92 | 1.40 |
| 3 | 1.75 | 4.26 |

The use of the most favorable ratio of reactants, No. 3, is described next.

Over a period of 1 hour, 184 grams (4.0 moles) of absolute ethyl alcohol were added to 1458 grams (7.0 moles) of phenyltrichlorosilane at 5° to 10°. Dry nitrogen removed the last traces of hydrogen chloride gas. The reaction mixture was carefully fractionated, and three fractions were isolated. A fraction, boiling up to 92°/11 mm., and weighing 775 grams, was isolated as unreacted phenyltrichlorosilane. Fraction 2, which boiled at 96° to 97°/11 mm., had a refractive index at 7° of 1.5020, and weighed 476 grams (67 percent of theory), was shown to be phenyldichloroethoxysilane. Fraction 3, which boiled at 110° to 111°/11 mm., had a refractive index at 10° of 1.4807, and weighed 116 grams (15 percent of theory), was analyzed for, and found to be, phenylchlorodiethoxysilane. The two percentage yields stated last above are based upon recovered phenyltrichlorosilane.

The pot residue, phenyltriethoxysilane, was recovered.

EXAMPLE V

Gaseous boron trifluoride was passed through 476 grams (2.15 moles) of phenyldichloroethoxysilane at 90° to 110°. Any volatile products were distilled into a water-cooled trap. After 3 hours the reaction was stopped, and the material in the trap was distilled. The major portion of this fraction boiled at 82°, and appeared to be an ethoxy-fluoro-borane derivative.

The material in the reaction flask was distilled in vacuo. A fraction was collected, which boiled at 83.5° to 84.5°/47 mm. This was shown to be the desired product—namely, phenyldichlorofluorosilane. It weighed 345.5 grams (84.5 percent of theory, based upon the weight of the starting material—phenyldichloroethoxysilane).

EXAMPLE VI

Three moles (633 grams) of phenyltrichlorosilane were treated in the cold with 48 grams (1.5 moles) of absolute methanol. A stream of dry nitrogen was passed through the mixture to remove the hydrogen chloride formed. After standing over night at room temperature the reaction mixture was heated to 100° to 130°, and a vigorous stream of boron trifluoride gas was passed into the well-stirred liquid. A volatile product distilled at 80° to 90°, leaving the bulk of the material in the reaction vessel. When the distillation of volatiles had ceased (3 hours), the material remaining in the reaction vessel was distilled, and the following two fractions were collected:

Fraction 1, boiling at 132° to 134°, and weighing 30.0 grams, was identified by analysis as phenylchlorodifluorosilane.

Fraction 2, boiling at 165° to 167°, and weighing 90.5 grams, was found to be pure phenyldichlorofluorosilane.

The pot residue, weighing 304 grams, was found to consist essentially of unreacted starting material—namely, phenyltrichlorosilane.

There may be substituted for methyltrichlorosilane and phenyltrichlorosilane as starting materials (cf. Examples I to IV, VI) other alkyl and aryltrichlorosilanes—for examples, ethyltrichlorosilane and tolyltrichlorosilane. When the latter two compounds are reacted in the aforedescribed manner with a lower, aliphatic, monohydric alcohol, mono-, di-, and trialkoxy derivatives are formed. These derivatives, in turn, may be reacted with boron trifluoride to form, respectively, (a) ethyl homologues of methyldichlorofluorosilane, methylchlorodifluorosilane, and methyltrifluorosilane (cf. Examples I, II, III), and (b) tolyl homologues of phenyldichlorofluorosilane, phenylchlorodifluorosilane and phenyltrifluorosilane. (Cf. Examples V, VI.)

The aforestated objects and uses of our invention can be achieved by forming the foregoing homologous, first-step and second-step derivatives of the alkyl and aryltrichlorosilanes, employing one or another of the procedures described above.

It is to be understood that modifications and changes in detail in the aforedescribed means and method steps may be made without departing from the spirit of our invention; and that all exemplifications and variants of

We claim:
1. The method of making a monoalkylchlorofluorosilane which comprises reacting an excess of boron trifluoride with a monoalkylchloroalkoxysilane to cause only the alkoxy groups of the silane to be replaced by fluorine.

2. The method of making a monoalkylchlorofluorosilane which comprises reacting an excess of boron trifluoride in gaseous form with the vapors of a monoalkylchloroalkoxysilane to cause the alkoxy groups only of the silane to be replaced by fluorine.

3. The method of making a monoarylchlorofluorosilane which comprises reacting an excess of boron trifluoride with a monoarylchloroalkoxysilane to cause the alkoxy groups only of said silane to be replaced by fluorine.

4. The method of making a monoarylchlorofluorosilane which comprises reacting an excess of boron trifluoride in gaseous form with the vapors of a monoarylchloroalkoxysilane to cause the alkoxy groups only of the silane to be replaced by fluorine.

5. The method of making an alkylchlorofluorosilane which comprises reacting an excess of boron trifluoride with methyldichloroethoxysilane to form methyldichlorofluorosilane and separating the methyldichlorofluorosilane from the reaction mixture.

6. The method of making an arylchlorofluorosilane which comprises reacting an excess of boron trifluoride with phenyldichloroethoxysilane to form phenyldichlorofluorosilane and separating the phenyldichlorofluorosilane from the reaction mixture.

7. The method of effecting stoichiometric replacement of chloro by fluoro in an alkyltrichlorosilane which comprises, causing a member of the group consisting of methyl alcohol and ethyl alcohol to react with an alkyltrichlorosilane and to form a system including a mixture of alkyldichloroalkoxysilane, alkylchlorodialkoxysilane, and alkyltrialkoxysilane; causing replacement of alkoxy by fluoro in the three alkoxysilanes last named by passing an excess of boron trifluoride through said system; and separating the resulting alkyldichlorofluorosilane, alkylchlorodifluorosilane, and alkyl trifluorosilane from accompanying compounds and from each other.

8. The method of effecting stoichiometric replacement of chloro by fluoro in methyltrichlorosilane which comprises, causing a member of the group consisting of methyl alcohol and ethyl alcohol to react with methyltrichlorosilane and to form a system including a mixture of methyldichloroalkoxysilane, methylchlorodialkoxysilane, and methyltrialkoxysilane; causing replacement of alkoxy by fluoro in the three alkoxysilanes last named by passing an excess of boron trifluoride through said system; and separating the resulting methyldichlorofluorosilane, methylchlorodifluorosilane, and methyltrifluorosilane from accompanying compounds and from each other.

9. The method of effecting stoichiometric replacement of chloro by fluoro in an aryltrichlorosilane which comprises, causing a member of the group consisting of methyl alcohol and ethyl alcohol to react with an aryltrichlorosilane and to form a system including a mixture of aryldichloroalkoxysilane, arylchlorodialkoxysilane, and aryltrialkoxysilane; causing replacement of alkoxy by fluoro in the three alkoxysilanes last named by passing an excess of boron trifluoride through said system; and separating the resulting aryldichlorofluorosilane, arylchlorodifluorosilane, and aryltrifluorosilane from accompanying compounds and from each other.

10. The method of effecting stoichiometric replacement of chloro by fluoro in phenyltrichlorosilane which comprises, causing a member of the group consisting of methyl alcohol and ethyl alcohol to react with phenyltrichlorosilane and to form a system including a mixture of phenyldichloroalkoxysilane, phenylchlorodialkoxysilane, and phenyltrialkoxysilane; causing replacement of alkoxy by fluoro in the three alkoxysilanes last named by passing an excess of boron trifluoride through said system; and separating the resulting phenyldichlorofluorosilane, phenylchlorodifluorosilane, and phenyltrifluorosilane from accompanying compounds and from each other.

11. The method of effecting stoichiometric replacement of chloro by fluoro in an R-trichlorosilane—where R represents a radical of the class consisting of methyl, ethyl, phenyl and tolyl—which comprises, causing a member of the group consisting of methyl alcohol and ethyl alcohol to react with an R-trichlorosilane and to form a system including a mixture of R-dichloroalkoxysilane, R-chlorodialkoxysilane, and R-trialkoxysilane; causing replacement of alkoxy by fluoro in the three alkoxysilanes last named by passing an excess of boron trifluoride through said system; and separating the resulting R-dichlorofluorosilane, R-chlorodifluorosilane, and R-trifluorosilane from accompanying compounds and from each other.

References Cited in the file of this patent
UNITED STATES PATENTS

| | | |
|---|---|---|
| 2,436,777 | Pletcher et al. | Feb. 24, 1948 |
| 2,477,704 | Sowa | Aug. 2, 1949 |
| 2,485,928 | Servais | Oct. 25, 1949 |
| 2,502,286 | Sowa | Mar. 28, 1950 |
| 2,521,673 | Britton et al. | Sept. 12, 1950 |
| 2,637,719 | Dereich | May 5, 1953 |
| 2,648,654 | Dereich | Aug. 11, 1953 |
| 2,713,063 | Sommer | July 12, 1955 |

OTHER REFERENCES

Wilberg et al.: "Z Naturforschung", volume 8B (1953), pages 608–9 (48 Chem. Abstr. 4346 g.), Booth et al.: "Jour. Am. Chem. Soc.," volume 68 (1946), pages 2650–66.